(12) United States Patent
Chen et al.

(10) Patent No.: US 8,050,507 B2
(45) Date of Patent: Nov. 1, 2011

(54) 3D DEPTH GENERATION BY LOCAL BLURRINESS ESTIMATION

(75) Inventors: Liang-Gee Chen, Taipei (TW); Chao-Chung Cheng, Taipei (TW); Chung-Te Li, Taipei (TW); Ling-Hsiu Huang, Tainan (TW)

(73) Assignees: Himax Technologies Limited, Tainan County (TW); National Taiwan University, Taipei (TW)

( * ) Notice: Subject to any disclaimer, the term of this patent is extended or adjusted under 35 U.S.C. 154(b) by 650 days.

(21) Appl. No.: 12/242,650

(22) Filed: Sep. 30, 2008

(65) Prior Publication Data

US 2010/0080481 A1    Apr. 1, 2010

(51) Int. Cl.
*G06K 9/40*    (2006.01)

(52) U.S. Cl. ........ 382/255; 382/264; 382/254; 382/300; 382/154; 382/118; 348/578; 348/576

(58) Field of Classification Search ............... 382/255, 382/264, 254, 300, 154, 118; 348/578, 576
See application file for complete search history.

(56) References Cited

U.S. PATENT DOCUMENTS 7,573,489 B2 * 8/2009 Davidson et al. ............. 345/646
2007/0279415 A1 * 12/2007 Sullivan et al. ............... 345/427

* cited by examiner

*Primary Examiner* — Mike Rahmjoo
(74) *Attorney, Agent, or Firm* — Stout, Uxa, Buyan & Mullins, LLP

(57) ABSTRACT

A system of generating three-dimensional (3D) depth information is disclosed. A color and object independent local blurriness estimation unit analyzes blurriness of each pixel of a two-dimensional (2D) image. Subsequently, a depth assignment unit assigns depth information to the 2D image according to the analyzed blurriness.

22 Claims, 2 Drawing Sheets

3D DEPTH GENERATION BY LOCAL BLURRINESS ESTIMATION

BACKGROUND OF THE INVENTION

1. Field of the Invention

The present invention generally relates to three-dimensional (3D) depth generation, and more particularly to 3D depth generation by local blurriness estimation.

2. Description of the Prior Art

When three-dimensional (3D) objects are mapped onto a two-dimensional (2D) image plane by prospective projection, such as an image taken by a still camera or video captured by a video camera, a lot of information, such as the 3D depth information, disappears because of this non-unique many-to-one transformation. That is, an image point cannot uniquely determine its depth. Recapture or generation of the 3D depth information is thus a challenging task that is crucial in recovering a full, or at least an approximate, 3D representation, which may be used in image enhancement, image restoration or image synthesis, and ultimately in image display.

A still or video camera as mentioned above typically includes, among other things, a lens, through which incoming parallel rays pass to converge and intersect at a focal point along a lens optical axis. The distance from the lens to the focal point is called the focal length. An object in the 2D image is in focus (or focused) if light from the object is, or is almost, converged, and is out of focus (or de-focus, defocused, or unfocused) if light from the object is not well converged. The de-focus or defocused object in the image appears blurred, and the blur degree, or blurriness, is in proportion to the distance or the depth. Therefore, a measure of the degree of de-focus is conventionally used to generate 3D depth information.

One conventional 3D depth information generation method is performed by collecting the blurriness of a specific area which is captured many times respectively with different distances. Hence, 3D depth information of the entire image can be obtained according to the collected blurriness and distances.

Another conventional 3D depth information generation method is performed by applying a 2D frequency transform or a high pass filter to respective areas of a single image in order to determine magnitude(s) of high-frequency component(s), representing respective blurriness. Hence, 3D depth information of an entire image can be obtained according to the blurriness. This method unfortunately fails when objects in the image have different colors, have the same, close or similar brightness, or have indistinct texture, as a result of difficulties being presented in differentiating the blurriness among the objects in such situations.

For reasons including the fact that conventional methods could not faithfully and easily generate 3D depth information, a need has arisen to propose a system and method of 3D depth generation that can recapture or generate 3D depth information to faithfully and easily recover or approximate a full 3D representation.

SUMMARY OF THE INVENTION

In view of the foregoing, it is an object of the present invention to provide a novel system and method of 3D depth information generation for faithfully and easily recovering or approximating a full 3D representation.

According to one embodiment, a color and object independent local blurriness estimation unit analyzes a blurriness of each of a plurality of (e.g., all) pixels of a two-dimensional (2D) image. Subsequently, a depth assignment unit assigns depth information to the 2D image according to the blurriness data (e.g., determined for each of the pixels). In the embodiment, the color and object independent local blurriness estimation unit includes a filter that generates a high order statistic (HOS), indicative of the blurriness. The filter is utilized three times to respectively analyze the pixels for red, green and blue expression or content to obtain respective statistics, among which a largest one is chosen as a leading performer during the depth assignment.

DETAILED DESCRIPTION OF THE INVENTION

Figure 1:
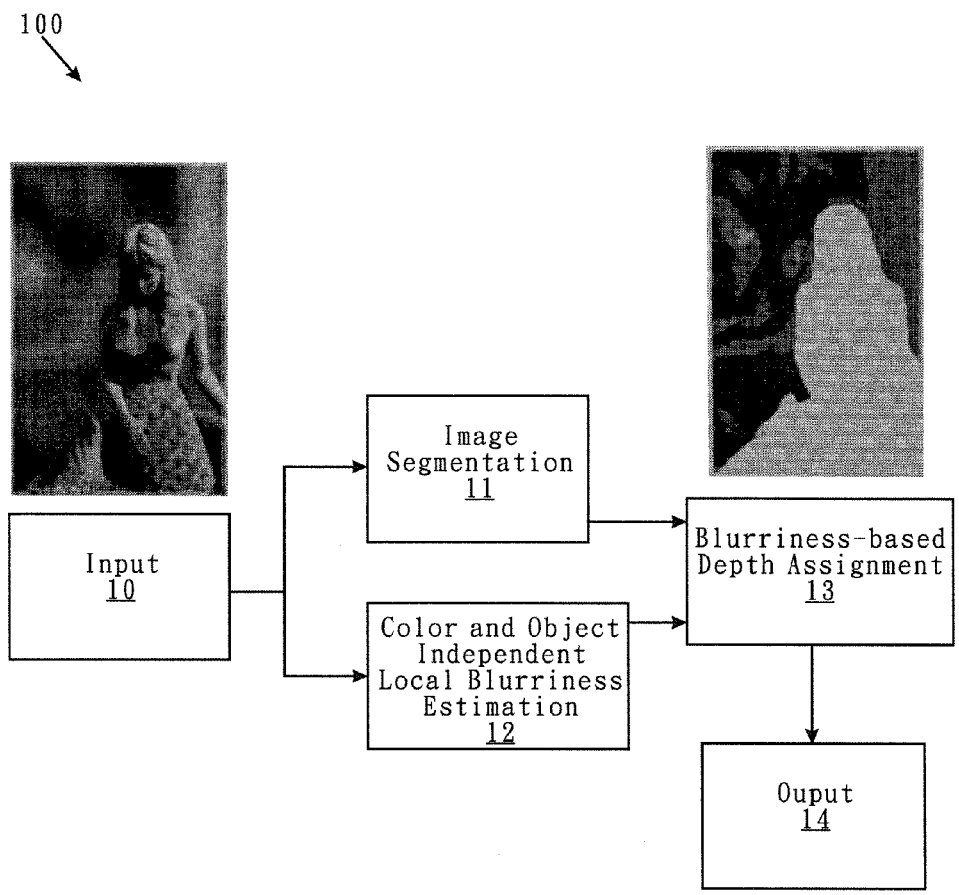
FIG. 1 illustrates a block diagram of a 3D depth information generation system according to one embodiment of the present invention.
Figure 2:
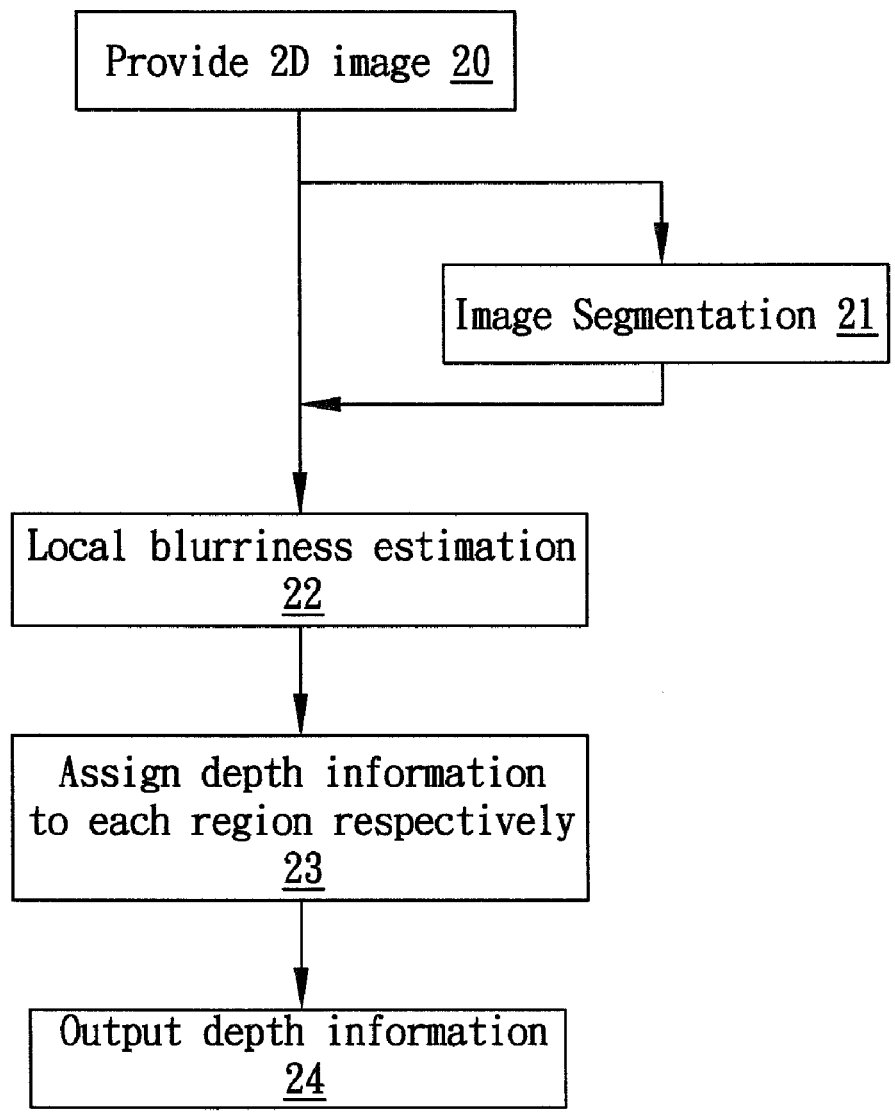
FIG. 2 illustrates an associated flow diagram demonstrating the steps of a 3D depth information generation method according to the embodiment of the present invention.

FIG. 1 illustrates a block diagram of a three-dimensional (3D) depth information generation device or system 100 according to one embodiment of the present invention. FIG. 2 illustrates an associated flow diagram demonstrating steps of the 3D depth information generation method according to the embodiment of the present invention.

With more particular reference to these figures, an input device 10 provides or receives one or more two-dimensional (2D) input image(s) to be image/video processed in accordance with the embodiment of the present invention (step 20). The input device 10 may in general be an electro-optical device that maps 3D object(s) onto a 2D image plane by prospective projection. In one embodiment, the input device 10 may be a still camera that takes the 2D image, or a video camera that captures a number of image frames. The input device 10, in another embodiment, may be a pre-processing device that performs one or more of digital image processing tasks, such as image enhancement, image restoration, image analysis, image compression and image synthesis. Moreover, the input device 10 may further include a storage device, such as a semiconductor memory or hard disk drive, which stores the processed image from the pre-processing device. As discussed above, a lot of information, particularly the 3D depth information, is lost when the 3D objects are mapped onto the 2D image plane, and therefore, according to an aspect of the invention, the 2D image provided by the input device 10 is subjected to image/video processing through other blocks of the 3D depth information generation system 100, as discussed below.

The 2D image is optionally processed by an image segmentation unit 11 that segments the image (e.g., the entire image) into a number of regions, or sets of pixels (step 21). In this specification, the term "unit" is used to denote a circuit, a part of a program, or their combination. The purpose of this segmentation is to provide one or more of enhanced ease and greater accuracy to the following processing. In the embodiment, the segmentation unit 11 uses conventional image processing technique(s) to detect or identify the boundaries of objects.

Subsequently, a color and object independent local blurriness estimation unit 12 analyzes the blurriness (or the blur degree) of each pixel (step 22). The filter in the embodiment is independent of the color and the object, and is thus capable of differentiating blurriness (e.g., determining or estimating relative blurriness) among the objects. A preferred filter has, but is not limited to, the algorithm illustrated below:

$$\hat{m}_C^{(4)}(x, y) = \frac{1}{N_\eta} \sum_{(s,t)\in\eta(x,y)} (I_{color}(s, t) - \hat{m}_C(x, y))^4$$

where $I_{color}$ represents the pixel intensity of red (i.e., $I_{red}$), green (i.e., $I_{green}$) or blue (i.e., $I_{blue}$);
$\eta(x, y)$ represents the set of pixels neighboring the pixel (x, y);
$N_\eta$ represents the total number of pixels in the set;
$\hat{m}_C$ represents the mean value of red (i.e., $\hat{m}_R$), green (i.e., $\hat{m}_G$) or blue (i.e., $\hat{m}_B$), and can be expressed as $$\hat{m}_C(x, y) = \frac{1}{N_\eta} \sum_{(s,t)\in\eta(x,y)} I_{color}(s, t)$$

In the embodiment, a high order statistic (HOS) or high order central moment is obtained to estimate the blurriness. In this specification, the term "high order" means an order greater than two (2). Although a high order statistic(s), particularly the fourth (4) order, is preferably used in the embodiment, the second order can be used instead in another embodiment. The obtained HOS is used to estimate the blurriness. That is, a larger HOS indicates that the associated region is closer to the viewer, and vice versa.

In the embodiment, the filter proposed above is utilized three times to respectively analyze the pixels for red, green and blue presence, intensity, expression and/or content to obtain respective HOS. The largest HOS for (or among) the red, the green and the blue colors is chosen as the leading performer during the depth assignment. For example, if the HOS for the red channel is the largest one, the following depth assignment is then performed exclusively according to the red channel.

In a further embodiment, the absolute value of the statistic (s) is considered to obtain an absolute HOS that is usually more accurate than the normal HOS, and is expressed as follows:

$$\overline{\hat{m}}_C^{(4)}(x, y) = \frac{\hat{m}_C^{(4)}(x, y)}{\hat{m}_C^{(abs)}(x, y)}$$

where $$\hat{m}_C^{(abs)}(x, y) = \frac{1}{N_\eta} \sum_{(s,t)\in\eta(x,y)} |I_{color}(s, t) - \hat{m}_C(x, y)|$$

The segmentation information from the image segmentation unit 11 and the blurriness estimation from the local blurriness estimation unit 12 are forwarded to a depth assignment unit 13 that assigns depth information to each region (or segment) respectively (step 23). Generally speaking, each region is assigned depth information in a distinct manner, although according to modified embodiments one, a plurality of, or all of the regions may be assigned the depth information according to one or more of the same manner and a distinct (e.g., different) manner. Specifically, assignment(s) may be made, as an example, according to prior knowledge, which may relate to one or more image characteristics and which may be inputted, pre-generated, and/or pre-stored, whereby the depth assignment unit 13 assigns the depth information to pixels of a region according to the blurriness estimation(s).

Generally, smaller depth information (that is, closer to the viewer) is assigned to pixels of lesser blurriness, and larger depth information (that is, more distance to the viewer) is assigned to pixels of greater blurriness.

An output device 14 receives the 3D depth information from the depth assignment unit 13 and provides the resulting or output image (step 24). The output device 14, in one embodiment, may be a display device for presentation or viewing of the received depth information. The output device 14, in another embodiment, may be a storage device, such as a semiconductor memory or hard disk drive, which stores the received depth information. Moreover, the output device 14 may further, or alternatively, include a post-processing device that performs one or more of digital image processing tasks, such as image enhancement, image restoration, image analysis, image compression and image synthesis.

According to the embodiments of the present invention discussed above, the present invention can recapture or generate 3D depth information to faithfully and easily recover or approximate a full 3D representation, thus avoiding disadvantages encountered in conventional 3D depth information generation methods as described in the prior art section in this specification.

Although specific embodiments have been illustrated and described, it will be appreciated by those skilled in the art that various modifications may be made without departing from the scope of the present invention, which is intended to be limited solely by the appended claims.

What is claimed is:

1. A device for generating three-dimensional (3D) depth information, comprising:
   a color and object independent local blurriness estimation unit that analyzes blurriness of each of a plurality of pixels of a two-dimensional (2D) image; and
   a depth assignment unit that assigns depth information to the 2D image according to the blurriness analyses;
   wherein the color and object independent local blurriness estimation unit comprises a filter expressed as follows:

$$\hat{m}_C^{(n)}(x, y) = \frac{1}{N_\eta} \sum_{(s,t)\in\eta(x,y)} (I_{color}(s, t) - \hat{m}_C(x, y))^n$$

where n represents order of the filter;
$I_{color}$ represents pixel intensity of red, green or blue;
$\eta(x, y)$ represents a set of pixels neighboring the pixel (x, y);
$N_\eta$ represents total number of the pixels in the set;
$\hat{m}_C$ represents a mean value of red, green or blue, and can be expressed as $$\hat{m}_C(x, y) = \frac{1}{N_\eta} \sum_{(s,t)\in\eta(x,y)} I_{color}(s, t).$$

2. The device of claim 1, wherein a result of the filter is an n-th order statistic.

3. The device of claim 2, wherein the value of n is four.

4. The device of claim 2, wherein the filter is utilized three times to respectively analyze the pixels for red, green and blue to obtain respective statistics, from which a largest one is chosen as a leading performer during the depth assignment.

5. The device of claim 1, further comprising an absolute statistic that is expressed as follows:

$$\bar{m}_C^{(n)}(x,y) = \frac{\hat{m}_C^{(n)}(x,y)}{\hat{m}_C^{(abs)}(x,y)}$$

where $$\hat{m}_C^{(abs)}(x,y) = \frac{1}{N_\eta} \sum_{(s,t) \in \eta(x,y)} |I_{color}(s,t) - \hat{m}_C(x,y)|.$$

6. The device of claim 1, further comprising:
a segmentation unit that segments the 2D image into a number of regions.

7. The device of claim 1, wherein the depth assignment unit assigns smaller depth information to pixels of lesser blurriness, and assigns larger depth information to pixels of greater blurriness.

8. The device of claim 1, further comprising an input device that maps 3D objects onto a 2D image plane.

9. The device of claim 8, wherein the input device further stores the 2D image.

10. The device of claim 1, further comprising an output device that receives the 3D depth information.

11. The device of claim 10, wherein the output device further performs one or more of storing and displaying the 3D depth information.

12. A method of using a device to generate three-dimensional (3D) depth information, comprising:
using a processor to perform the steps of:
analyzing blurriness of each of a plurality of pixels of a two-dimensional (2D) image; and
assigning depth information to the 2D image according to the blurriness analyses;
wherein the blurriness analyzing step is performed by a filter expressed as follows:

$$\hat{m}_C^{(n)}(x,y) = \frac{1}{N_\eta} \sum_{(s,t) \in \eta(x,y)} (I_{color}(s,t) - \hat{m}_C(x,y))^n$$

where n represents order of the filter;
$I_{color}$ represents pixel intensity of red, green or blue;
$\eta(x,y)$ represents a set of pixels neighboring the pixel $(x,y)$;

$N_\eta$ represents total number of the pixels in the set;
$\hat{m}_C$ represents a mean value of red, green or blue, and can be expressed as $$\hat{m}_C(x,y) = \frac{1}{N_\eta} \sum_{(s,t) \in \eta(x,y)} I_{color}(s,t).$$

13. The method of claim 12, wherein a result of the filter is an n-th order statistic.

14. The method of claim 13, wherein value of n is four.

15. The method of claim 13, wherein the filter is utilized three times to respectively analyze the pixels for red, green and blue to obtain respective statistics, among which a largest one is chosen as a leading performer during the depth assignment.

16. The method of claim 12, further comprising an absolute statistic that is expressed as follows:

$$\bar{m}_C^{(n)}(x,y) = \frac{\hat{m}_C^{(n)}(x,y)}{\hat{m}_C^{(abs)}(x,y)}$$

where $$\hat{m}_C^{(abs)}(x,y) = \frac{1}{N_\eta} \sum_{(s,t) \in \eta(x,y)} |I_{color}(s,t) - \hat{m}_C(x,y)|.$$

17. The method of claim 12, further comprising a step of segmenting the 2D image into a number of regions.

18. The method of claim 12, in the depth assignment step, smaller depth information is assigned to the pixels of lesser blurriness, and larger depth information is assigned to the pixels of greater blurriness.

19. The method of claim 12, further comprising a step of mapping 3D objects onto a 2D image plane.

20. The method of claim 19, further comprising a step of storing the 2D image.

21. The method of claim 12, further comprising a step of receiving the 3D depth information.

22. The method of claim 21, further comprising a step of storing or displaying the 3D depth information.

* * * * *